No. 757,468. PATENTED APR. 19, 1904.
C. J. KEPLINGER.
BRAKE HANDLE.
APPLICATION FILED DEC. 7, 1903.
NO MODEL.

WITNESSES:
Joseph J. Hosler.
J. R. Bond.

INVENTOR
Claude J. Keplinger
BY F. W. Bond
ATTORNEY

No. 757,468. Patented April 19, 1904.

UNITED STATES PATENT OFFICE.

CLAUDE J. KEPLINGER, OF CANTON, OHIO, ASSIGNOR TO THE CANTON HARD RUBBER COMPANY, OF CANTON, OHIO, A CORPORATION OF OHIO.

BRAKE-HANDLE.

SPECIFICATION forming part of Letters Patent No. 757,468, dated April 19, 1904.

Application filed December 7, 1903. Serial No. 184,052. (No model.)

*To all whom it may concern:*

Be it known that I, CLAUDE J. KEPLINGER, a citizen of the United States, residing at Canton, in the county of Stark and State of Ohio, have invented certain new and useful Improvements in Brake-Handles; and I do hereby declare that the following is a full, clear, and exact description of the same, reference being had to the accompanying drawings, making a part of this specification, and to the figures of reference marked thereon, in which—

Figure 1:
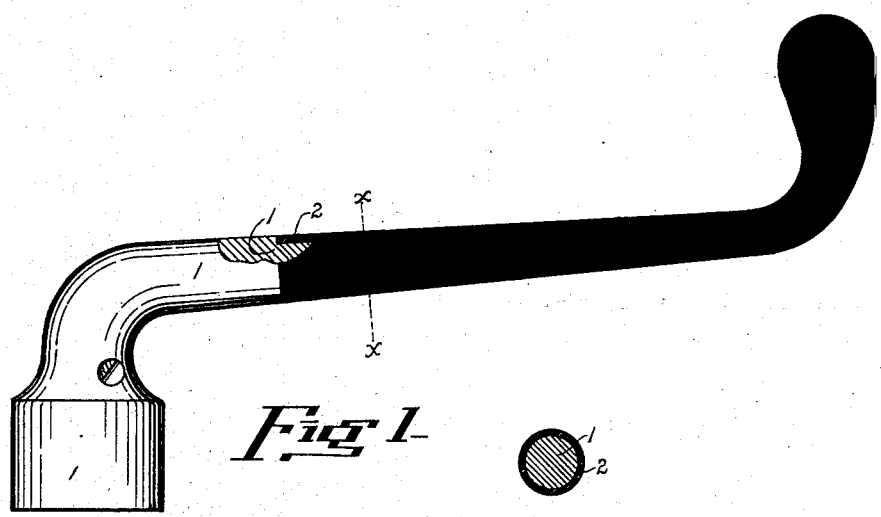
Figure 2:
Figure 3:
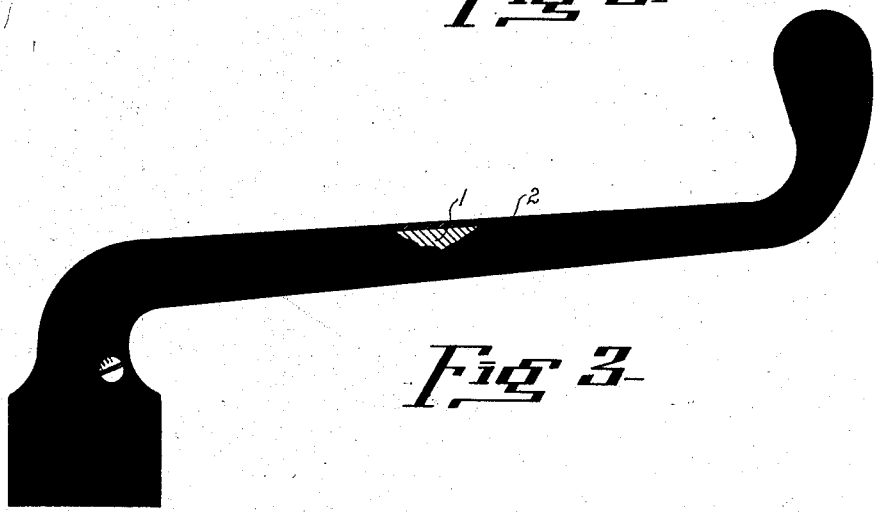

Figure 1 is a side elevation showing a handle partially insulated and parts broken away. Fig. 2 is a transverse section on line $x\ x$, Fig. 1. Fig. 3 is a side elevation showing the entire handle insulated and parts broken away.

The present invention has relation to brake-handles especially designed for operating brakes upon electric cars and controlling electric cars.

The object of the invention is to provide a handle that will not become charged with electricity from any cause, such as the grounding of the car or from any other cause.

Another object of the present invention is to provide a handle-bar that will be free from contamination and can be operated without danger of shock or injury in any way whatsoever.

Similar numerals of reference indicate corresponding parts in all the figures of the drawings.

In the accompanying drawings, 1 represents the handle, which is preferably of the form shown in the drawings; but inasmuch as the handle-bar within itself forms no particular part of the present invention in detail so far as attaching the same to the car-brake or controlling mechanism no detail description is deemed necessary.

The handle-bar 1, as shown in Fig. 1, is provided with insulation 2, which insulation is preferably formed of rubber and preferably vulcanized to the handle-bar 1, which handle-bar is of course formed of metal.

In Fig. 2 the entire handle-bar is shown provided with insulation 2, which insulation is vulcanized upon the handle-bar 1, so that the insulation and the handle-bar constitute partially integral parts after the insulating material has been properly attached to the metallic handle-bar.

It is well understood that handle-bars are usually formed of brass and that by the continuous use of the handle-bar operators are liable to become injured from impurities or shocked by an electric current; but by my improved device there is no danger either from electric currents or from any poisonous substance that may accumulate upon the surface of the exposed metal handle.

Having fully described my invention, what I claim as new, and desire to secure by Letters Patent, is—

As a new article of manufacture, a handle of the class described, adapted to be attached to the brake or controlling mechanism of a car, consisting of a metal center or base, the personal-contact surface of said metal center or base provided with a permanent and integral outer insulating-shell, substantially as and for the purpose set forth.

In testimony that I claim the above I have hereunto subscribed my name in the presence of two witnesses.

CLAUDE J. KEPLINGER.

Witnesses:
F. W. BOND,
J. R. BOND.